April 23, 1929.  E. H. McCLOUD  1,710,177
BUMPER
Filed Sept. 27, 1928   2 Sheets-Sheet 1
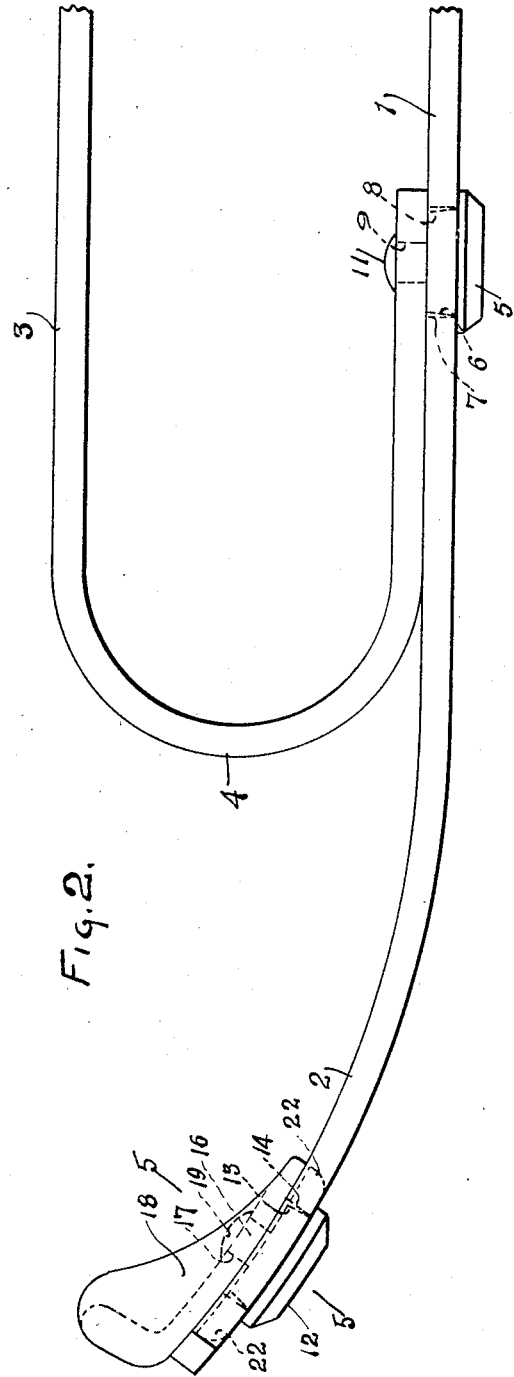
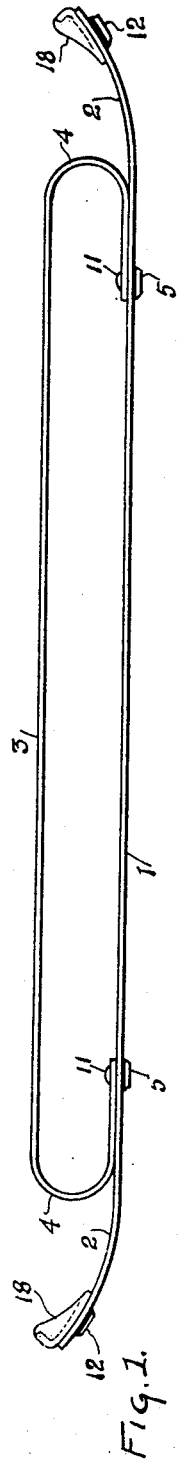
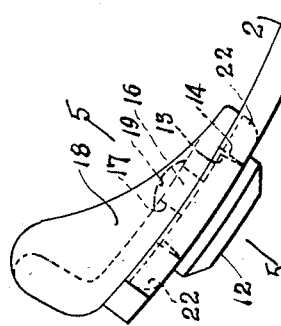
Edward H. McCloud, Inventor
By Toulmin & Toulmin
Attorneys April 23, 1929. E. H. McCLOUD 1,710,177
BUMPER
Filed Sept. 27, 1928 2 Sheets-Sheet 2
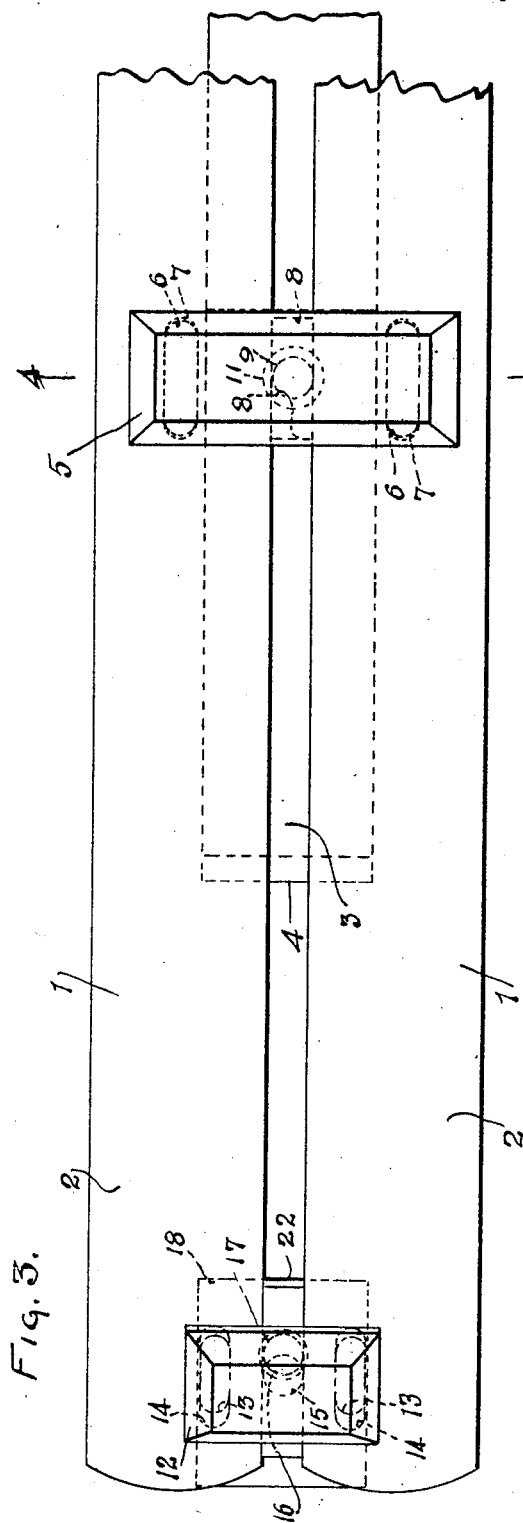
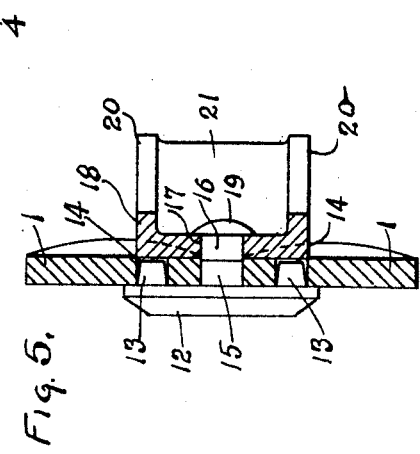
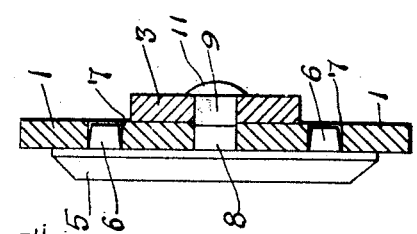
Inventor
EDWARD H. McCLOUD,
By Toulmin + Toulmin
Attorneys Patented Apr. 23, 1929.

1,710,177

UNITED STATES PATENT OFFICE.

EDWARD H. McCLOUD, OF COLUMBUS, OHIO, ASSIGNOR TO THE CENTRAL BRASS AND FIXTURE COMPANY, OF SPRINGFIELD, OHIO, A CORPORATION OF OHIO.

BUMPER.

Application filed September 27, 1928. Serial No. 308,717.

This invention relates to bumpers, and has for its purpose the provision of a bumper composed of a few parts and those parts united in such a way as to securely hold them against displacement and movement in regard to each other.

It is the object of this invention to provide a bumper in which there are essentially one back bar and two parallel spaced front bumper bars united to each other and to the back bar in firm and secure gripping relation.

It is also a purpose of this invention to provide a bumper in which the back bar is united to the impact bars in a secure manner, but without any direct gripping relation between the two parts other than that of friction. The holding of the parts together is accomplished by plates which securely grip the parts and hold them in relation to each other.

For the purpose of illustration there is shown in the accompanying drawings a preferred embodiment of this device, which is used only for the illustration.

In the drawings:

Figure 1 is a top plan view of the bumper in condition to be attached to an automobile.

Figure 2 is an enlarged view of one end of the bumper, as shown in Figure 1.

Figure 3 is a face view of the parts shown in Figure 2.

Figure 4 is a cross section on the line 4—4 of Figure 3.

Figure 5 is a cross section on the line 5—5 of Figure 2.

The bumper is shown as a whole in Figure 1, and is composed essentially of two parallel arranged bumper bars, each of which is indicated by the numeral 1. These bars are curved backward at the end, as indicated by the numeral 2. For the purpose of holding these bars in relation to each other and for the purpose of attachment to an automobile there is provided a back bar 3, which has each end thereof looped, as indicated by the numeral 4.

The ends of the back bar are attached to the impact bars by means of plates and rivets. The plate is indicated by the numeral 5, and has on each end thereof a stud 6. This stud is elongated and extends across the plate, and is adapted to engage a hole in either of the front bars. This hole 7 is elongated to sufficient size to receive the elongated stud 6.

At the central part of the plate 5 there is a stud 8, which extends substantially across the plate and is adapted to engage between the front bars and hold them in spaced relation to each other when the studs 6 are in engagement with the holes 7. The stud 8 has a round projection from the center thereof, which is adapted to fit within a correspondingly shaped hole in the back bar 3. This round projection on the stud 8 is indicated by the numeral 9 and fits in the correspondingly shaped hole in the bar 3.

For the purpose of holding the back bar assembled to the front bars and to the plate 5 the end of the rounded part 9 is formed into a head 11 by riveting. By this means these parts are firmly held together.

The bars 1 are prevented from moving apart by means of the studs 6, and are also held in contact with the back bar 3 by means of the rivet or stud 9. At each end of the front bars 1 there is a plate 12, which has formed thereon at each end an elongated stud 13. These studs 13 fit within holes 14 formed near the inner edges of the front bars 1.

Projecting from the central part of the plate 12 is an elongated stud 15 adapted to fit between the ends of the front bars to hold them in spaced relation. This stud 15 is extended in a round end part 16, which is adapted to fit within a similarly shaped hole 17 in a forging or casing 18.

When the parts are assembled as shown in Figure 5, with the studs 13 within the holes 14 and the stud 15 between the ends of bars 1, and the forging or casing 18 securely united thereto by means of the round extension of the stud 15, which is riveted as indicated by the numeral 19, the parts are securely held in fixed relation to each other.

The forging 18 has on each side thereof a flange 20. The outer ends of these flanges are united by a cross flange 21. By this means the casing 18 is formed substantially in the shape of a box, which contains the head 19 of the rivet that holds the parts together.

In order to further secure the part 18 to the end of the bars and prevent its rotation, there are formed on the casing 18 two ears 22. These ears extend between the bars in line with the stud 15.

On account of the studs 8, 15, 7 and 13 being elongated and fitting within similarly shaped holes the front bars, when thus united, are held in a way that there is very little longitudinal motion of one to the other, due to the length of these studs, which prevents any tendency to rotate one with respect to the other. That is, in other words, the plates 5 and 12 are held against tilting motion in relation to the front bars.

It will be observed that there is no direct connection of the back bar to the front bars. The only means of connecting the bars together is through the plates and the studs thereon. The front plates are connected to the front bars by means of studs and holes, and a spacing stud between the plates. The plates 5 are connected to the back bar by means of a rigid connection with the central stud which passes through the hole in the back bar.

From observation it will be seen that the parts have nothing more than a frictional contact with each other, and are held in engagement with each other by means of the plates. These plates being constructed as they are, and being firmly riveted to the back bar, hold the parts in position with relation to each other so as to prevent movement of one with respect to the other.

It is also to be noticed from an observation of Figures 4 and 5 that the central plates only contact with the edge of the middle of the front bars, and do not overlap the holes in the front bars, while from Figure 5 it will be seen that the end plates having their studs near the inner margin of the front bars, the member 18 extends over the holes in the front bars and entirely protects the stud 13.

I desire to comprehend within my invention such modifications as may be clearly embraced within my claims and the scope of my invention.

Having thus fully described my invention, what I claim as new and desire to secure by Letters Patent, is:

1. In a bumper, a pair of bumper bars, each having a hole in one end thereof, a plate having studs thereon to engage said holes and a stud fitting between said bars, a casing adapted to receive the last named stud, said stud having its end riveted against said casing to hold the bars in relation to each other.

2. In a bumper, a pair of bumper bars held in spaced parallel relation to each other, a plate engaging one side of said bars at the ends thereof, and a casing engaging the other side of said bars, said plate and casing cooperating with each other and the bars to hold the bars against movement with relation to each other to protect the end of the bumper.

3. In a bumper, a pair of bumper bars arranged in spaced parallel relation to each other, each bar having a hole remote from the end thereof, a plate having studs thereon in engagement with said holes and a stud extending between said bars and engaging the edges thereof, and a back bar having a hole in an end thereof, said back bar engaging said pair of bars across the space therebetween with the last named stud in said end hole, and riveted so that the back bar is held to said plate and the bumper bars.

4. In a bumper, a pair of bumper bars, means engaging the ends of said bars to hold said bars in spaced parallel relation to each other, said means including a casing having end and side flanges to give strength to the end of said bars and forming a part of the end of said bumper, and ears fitting between the bars to space the bars and keep the casing from turning.

5. In a bumper, a pair of bumper bars, means to hold said bars in spaced parallel relation to each other, said means including a casing having end and side flanges to give rigidity to the end of the bumper and ears fitting between the bars, and a plate cooperating with the casing to grip and firmly hold the bars.

6. In a bumper, a pair of bumper bars arranged in spaced parallel relation to each other, each bar having a hole near each end thereof, plates having studs in engagement with said holes, studs on said plates extending between said bars and engaging the edges thereof, a back bar having a hole in each end thereof, said back bar engaging said pair of bars across the space therebetween with the last named stud in said hole, and riveted so that the back bar is held to said plate and bumper bars.

7. In a bumper, a pair of bumper bars, each bar having an oblong hole therein, a back bar having a hole therein and in engagement with said pair of bars, and a plate having lugs thereon to fit in said holes and a lug to fit between said pair of bars and engage the edges thereof, the end of said last named lug being in the hole in the back bar and riveted thereto to hold the bars in relation to each other.

In testimony whereof, I affix my signature.

EDWARD H. McCLOUD.